United States Patent [19]

Stecher et al.

[11] 4,201,804

[45] May 6, 1980

[54] GASKET IMPREGNATED WITH A POLYMERIZABLE LIQUID AND METHOD FOR ITS MANUFACTURE

[75] Inventors: Friedhelm Stecher, Burscheid; Josef Fazekas, Wermelskirchen; Paul Jöhren, Dortmund-Hörde; Martin Morsbach, Hilgen, all of Fed. Rep. of Germany

[73] Assignee: Goetzewerke Friedrich Goetze AG, Burscheid, Fed. Rep. of Germany

[21] Appl. No.: 918,820

[22] Filed: Jun. 26, 1978

Related U.S. Application Data

[62] Division of Ser. No. 438,357, Jan. 31, 1974, abandoned.

[30] Foreign Application Priority Data

Jan. 31, 1973 [DE] Fed. Rep. of Germany ....... 2304558

[51] Int. Cl.² .......................... B05D 3/02; B05D 1/18
[52] U.S. Cl. .............................. 427/393.6; 277/235 B; 427/443.2; 428/64; 428/80; 428/133; 428/137
[58] Field of Search ............... 427/385 C, 430 B; 428/64, 80, 133, 137, 443, 444, 138, 131, 462; 277/1, 231, 235 R, 235 A, 235 B

[56] References Cited

U.S. PATENT DOCUMENTS

| | | | |
|---|---|---|---|
| 2,077,669 | 4/1937 | Bruce | 428/443 |
| 2,330,106 | 9/1943 | Bernstein et al. | 428/444 |
| 2,977,248 | 3/1961 | Flowers | 428/443 |
| 2,992,151 | 7/1961 | Niessen | 428/444 |
| 3,661,401 | 5/1972 | Farnam | 277/227 |
| 3,814,619 | 6/1974 | Kobayashi et al. | 427/385 C |
| 3,970,322 | 7/1976 | Stecher et al. | 277/235 B |

*Primary Examiner*—William J. Van Balen
*Attorney, Agent, or Firm*—Spencer & Kaye

[57] ABSTRACT

A gasket made of a fibrous and/or porous material is impregnated with a liquid saturating agent consisting essentially of an organic, synthetic and completely polymerizable liquid that does not contain agents which will evaporate during polymerization of the liquid.

8 Claims, 1 Drawing Figure

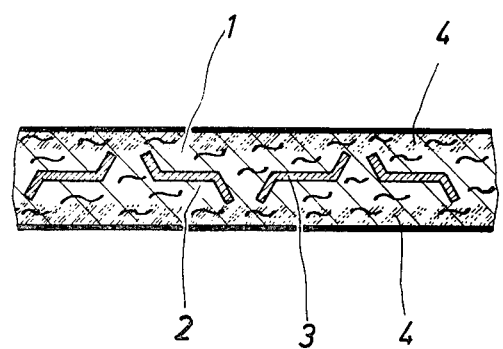

4,201,804

GASKET IMPREGNATED WITH A POLYMERIZABLE LIQUID AND METHOD FOR ITS MANUFACTURE

CROSS REFERENCE TO RELATED APPLICATION

This application is a division of copending application Ser. No. 438,357, filed Jan. 31, 1974, now abandoned.

BACKGROUND OF THE INVENTION

The present invention relates to a gasket of a fibrous and/or porous material, and more particularly to a cylinder head gasket which is made of a disc of soft material, which is partially or completely saturated with a liquid.

Cylinder head seals for internal-combustion engines often are made of a fibrous material, such as, for example, asbestos, which is possibly reinforced with one or a plurality of imbedded or superimposed metal plates. The starting material for such cylinder head gaskets is an asbestos fiber mass mixed with binders such as natural or synthetic rubber, and which is connected with the metal plates in the form of a disc.

Cylinder head gaskets contain passages for the combustion chamber, the coolant and the lubricant. In the region of these passages the sealing edges must be particularly tight against the hot gases of the combustion chamber which gases are under high pressure, against the lubricant and against the coolant which might contain anti-freeze. A simple gasket made of asbestos fiber, binder and possibly reinforcing metal plates is not sufficient for this purpose because the cross-sectional density of the porous asbestos fiber material is unsatisfactory and the media to be sealed can pass through the seal. An additional improvement in the density of the asbestos material is required.

In the past, the microseal at the surface of cylinder head gaskets has been improved by providing the gaskets with coating layers. Also the cross-sectional density of the asbestos fiber layer has been improved by impregnating or saturating the asbestos fiber layer with suitable impregnating or saturating agents. The impregnating or saturating agents that have been used include solutions, dispersions, emulsions or latexes of polymerized or polymerizable substances. According to German Pat. No.1,072,032, for example, the impregnation is effected with such agents, but only in the immediate region of the passages. According to still other methods, self-drying vegetable oils, such as linseed oil with or without additives (see, for example, German Pat. No. 740,388 and U.S. Pat. No. 2,040,348), are used as the impregnating agent.

In the above-mentioned methods there exists the drawback that the polymerized or polymerizable material is applied to the asbestos fiber layer together with a solvent, a dispersing agent or an emulsion agent. These components are volatile and evaporate in the subsequent drying process and this evaporation produces cavities or pores and causes the fibrous material to swell. Subsequently the fibrous material must be pressed to increase its density and become particularly capable of sealing.

The use of self-drying oils of a vegetable origin also has not found acceptance for impregnating purposes. Presumably, the reason is that the resinified oils, such as linseed oil, are saponifiable and not sufficiently resistant against lubricants, water and combustion gases.

SUMMARY OF THE INVENTION

It is the object of the present invention to provide a cylinder head gasket with an improved cross-sectional density wherein the drawbacks of the known cylinder head gaskets are eliminated and which can be produced as inexpensively as possible.

This is accomplished according to the present invention by employing a saturating agent which consists essentially of an organic, synthetic and polymerizable liquid which does not contain any volatile agents. The saturating agent is applied in a known manner by immersion, spraying on or rolling into the asbestos fiber layer and is then polymerized thermally, peroxidically, with sulfur or according to other known methods depending upon the particular polymerizable liquid that is being used. The liquid must thus be completely polymerizable and must not emit evaporating substances during heating to the maximum operating temperature of the engine, contrary to the known saturating agents, and it must have a low viscosity so that it is assured that the fiber material is completely saturated at least in the surface areas.

BRIEF DESCRIPTION OF THE DRAWING

The FIGURE is a partial cross-sectional view of a gasket made in accordance with the teachings of the present invention.

DETAILED DESCRIPTION OF THE INVENTION

The gaskets of the present invention are made of a thermally stable soft material such as a fiber fleece of asbestos. The soft material is cut out in the specific shape required for the particular application is to be used in, such as a cylinder head gasket for an internal combustion engine, and generally is in the shape of a disc having various passages for the combustion chambers, coolant and lubricant.

The gasket can comprise a single disc of soft material, or as shown in the FIGURE two external soft material discs 1 and 2 having a metal reinforcement 3, such as a metal disc, therebetween, or a soft material disc which is covered on one side with a metal disc. Further, the edges of the gasket adjacent the combustion chamber passages can contain a metal casing or bordering flange having an approximately U-shaped cross section to protect these edges with the arms of the U lying on the opposing lateral planar surfaces of the gasket and the base of the U lying against the cylindrical surface of the passage. A bordering casing for coolant, lubricant and other passages can also be provided and generally comprises metal discs which lie on the lateral planar surfaces of the gasket to protect the planar surfaces of the gasket, while the cylindrical surface of these passages are not protected by a casing.

After the gasket has been formed into its desired shape, it is impregnated with a saturating agent, as shown in the FIGURE by reference numeral 4, consisting essentially of an organic, synthetic and completely polymerizable liquid which does not contain any volatile agents.

Exemplary polymerizable liquid saturating agents that can be employed in the practice of the present invention include polybutadiene, polymethacrylate, polycrotonaldehyde, systems of isocyanates with alcohols or amines, systems of epoxides and alcohols and amines and systems of acroylchloride and esters of acrylic acid.

The polymerizable liquids used in the present invention are well known and can be polymerized in accordance with conventional methods. Depending on the particular liquid, polymerization can occur through the use of free radical initiation such as by compounds such as organic peroxides, through the use of compounds such as sulfur which is a well known curing and vulcanizing agent or by thermal means.

Liquids polymerizable by sulfur include polybutadiene and liquid styrolbutadiene-rubbers. These liquids can be polymerized by conventional technique as by heating a mixture of the liquid and sulfur at tempratures of from about 120° to 190° C. for 2 to 30 minutes.

Liquids polymerizable by organic peroxides such as benzoyl peroxide include methacrylates, crotonaldehyde and esters of acrylic acid. These liquids can be polymerized by conventional methods well known in the art as by heating a mixture of the liquid and peroxide at temperatures of from about 125° to 200° C. for 2 to 30 minutes.

Thermally polymerizable liquids that can be used in the practice of the present invention are those liquids that can be polymerized solely by heat and include systems of epoxides with amines or alcohols, systems of isocyanates with amines or alcohols. Generally, these liquids are heated at a temperature between 40° and 200° C. for about 5 minutes to 10 hours.

The polymerizable liquids used in the present invention preferably have a low viscosity of 200 to 1.500 centipoises at a temperature of 20° C., and when completely polymerized have a molecular weight in the range between 3.000 and 80.000. As used herein, the term "completely polymerizable" indicates 80.000.

In order to obtain a tight cylinder head gasket and provide a good seal, the asbestos fiber layer in the ready to be installed gasket must still be compressible after it is impregnated and accordingly, not all of the pores should be filled with the saturating liquid.

Further, in a preferred embodiment of the invention, the saturating agent is only partially polymerized in the cylinder head gasket to be installed to insure compressibility. Complete polymerization then takes place after the gasket is installed. In this way it is possible for the gasket to plastically adapt itself to unevennesses in the surfaces to be sealed. The partial polymerization can be controlled by additives and/or by regulating time, temperature and other reaction conditions of the polymerization. The partial polymerization should be conducted to a point where the liquid mass takes on a solid condition, but can still be plastically deformed.

Typical non-volatile additives for controlling the polymerization which would not evaporate under the conditions of polymerization include inhibitors and retarders such as amines. When the gasket is installed in an engine, it is subjected to temperatures in the range of about 90° to 180° C. and at these temperatures the saturating agent becomes completely polymerized.

If required, solids in dispersion may also be added to the saturation liquid, which solids enrich the surface of the asbestos fibers during the saturation process. These are substances which counteract tackiness, such as graphite or talcum, for example. Alternatively, these substances can be coated on the gasket after polymerization is completed. If desired, the saturating agents used in the present invention can contain small quantities of fillers, extenders, or softeners with a high boiling point, as these ingredients will not volatilize and cause undesirable pore formation and swelling.

The present invention simultaneously reduces manufacturing costs since no solvents, dispersion agents or emulsifiers need be removed from the saturated seal during time consuming drying processes and recovered in expensive assemblies. Moreover, the previously required subsequent increase in density of the asbestos material by pressing becomes superfluous.

EXAMPLE

A completely cut and flanged asbestos cylinder head gasket is immersed into a bath containing 100 parts viscous polybutadiene (molecular weight 1500) and 12 parts mineral oil as a filler so that part of the pores of the asbestos fiber layer are saturated with the polybutadiene saturating agent.

The polybutadiene contains 8 to 14 parts of benzoyl peroxide as a curing agent and has a viscosity of 750 to 1.500 centipoises at a temperature of 20° to 50° C. The gasket is kept in the bath for 5 minutes and then removed.

The gasket is then placed in a furnace and heated for about three hours at about 130° C. to polymerize the polybutadiene. By the addition of, for example, agents to protect against complete polymerization, chain termination reactions occur which permit regulation of the amount and degree of polymerization so that the polymerizate still has a good plasticity. Thereafter, the surface of the gasket is coated in a conventional manner with a layer containing graphite, talcum or similar substances to counteract tackiness. The resulting cylinder head gasket is now installed in an engine. The gasket adapts itself well to the unevennesses in the surfaces to be sealed because the asbestos layer still contains pores and the saturation liquid is still plastic and compressible.

After installation in the engine a further thermal polymerization of the saturating agent takes place at the operating temperature of the engine so that the desired cross-sectional density is obtained with the desired impermeability to combustion gases, lubricants and coolants.

Generally, gaskets produced in accordance with the present invention have a cross-sectional density of between about 1,5 to 1,8 g/cc.

The agent which is used to protect against complete polymerization is N-nitrosodiphenylamine.

It will be understood that the above description of the present invention is susceptible to various modifications, changes and adaptations, and the same are intended to be comprehended within the meaning and range of equivalents of the appended claims.

We claim:

1. A method of forming a gasket comprising impregnating a fibrous and/or porous material with a liquid saturating agent consisting essentially of an organic, synthetic and completely polymerizable liquid that does not contain agents which will evaporate during polymerization of the liquid, and polymerizing the liquid.

2. The method according to claim 1 wherein the liquid saturating agent is polymerized either thermally, peroxidically, or with sulfur.

3. The method according to claim 1 wherein the liquid saturating agent is partially polymerized, before the gasket is installed in an engine, to a point where the gasket still is plastically deformable.

4. The method as defined in claim 3 including placing the gasket in an engine and completely polymerizing the saturating agent by the heat generated by the engine.

5. The method as defined in claim 1 wherein not all of the pores of the soft material are completely filled with the polymerizable liquid.

6. The method as defined in claim 1 wherein the liquid saturating agent contains solid substances in dispersion.

7. The method as defined in claim 1 wherein the solid substances are graphite or talcum to counteract tackiness.

8. The method as defined in claim 1 wherein the polymerizable liquid consists essentially of polybutadiene.

* * * * *